(12) United States Patent
Swanson et al.

(10) Patent No.: US 10,146,657 B2
(45) Date of Patent: Dec. 4, 2018

(54) INITIALIZATION TRACE OF A COMPUTING DEVICE

(71) Applicants: Robert C. Swanson, Chandler, AZ (US); C. Brendan Traw, Portland, OR (US); Vincent J. Zimmer, Federal Way, WA (US); Mallik Bulusu, Olympia, WA (US); John R. Lindsley, Tacoma, WA (US); Mahesh S. Natu, Sunnyvale, CA (US); Dimitrios Ziakas, Hillsboro, OR (US); Robert W. Cone, Portland, OR (US); Madhusudhan Rangarajan, Round Rock, TX (US); Babak Nikjou, Tempe, AZ (US); Kirk D. Brannock, Hillsboro, OR (US); Russell J. Wunderlich, Livermore, CO (US); Miles F. Schwartz, Portland, OR (US); Stephen S. Pawlowski, Beaverton, OR (US)

(72) Inventors: Robert C. Swanson, Chandler, AZ (US); C. Brendan Traw, Portland, OR (US); Vincent J. Zimmer, Federal Way, WA (US); Mallik Bulusu, Olympia, WA (US); John R. Lindsley, Tacoma, WA (US); Mahesh S. Natu, Sunnyvale, CA (US); Dimitrios Ziakas, Hillsboro, OR (US); Robert W. Cone, Portland, OR (US); Madhusudhan Rangarajan, Round Rock, TX (US); Babak Nikjou, Tempe, AZ (US); Kirk D. Brannock, Hillsboro, OR (US); Russell J. Wunderlich, Livermore, CO (US); Miles F. Schwartz, Portland, OR (US); Stephen S. Pawlowski, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 359 days.

(21) Appl. No.: 14/226,612

(22) Filed: Mar. 26, 2014

(65) Prior Publication Data

US 2015/0278068 A1   Oct. 1, 2015

(51) Int. Cl.
*G06F 11/14* (2006.01)
*G06F 11/34* (2006.01)
(Continued)

(52) U.S. Cl.
CPC ........ *G06F 11/3476* (2013.01); *G06F 9/4403* (2013.01); *G06F 9/4416* (2013.01);
(Continued)

(58) Field of Classification Search
CPC .................................................... G06F 9/4401
See application file for complete search history.

(56) References Cited

U.S. PATENT DOCUMENTS

| 6,289,448 B1* | 9/2001 | Marsland | G06F 11/362 |
| | | | 713/2 |
| 8,874,892 B1* | 10/2014 | Chan | G06F 21/572 |
| | | | 713/100 |

(Continued)

FOREIGN PATENT DOCUMENTS

| CN | 101135988 A | 3/2008 |
| JP | 2003-076578 | 3/2003 |

OTHER PUBLICATIONS

International Search Report and Written Opinion dated Apr. 29, 2015 for International Application No. PCT/US2015/013317, 11 pages.

(Continued)

*Primary Examiner* — Kim Huynh
*Assistant Examiner* — Eric Chang

(74) *Attorney, Agent, or Firm* — Schwabe, Williamson & Wyatt, P.C.

(57) ABSTRACT

Platform controller, computer-readable storage media, and methods associated with initialization of a computing device. In embodiments, a platform controller may comprise a boot controller and one or more non-volatile memory modules, coupled with the boot controller. In embodiments, the one or more non-volatile memory modules may have first instructions and second instructions stored thereon. The first instructions may, when executed by a processor of a computing device hosting the platform controller, cause initialization of the computing device. The second instructions, when executed by the boot controller, may cause the boot controller to monitor at least a portion of the execution of the first instructions by the computing device and may generate a trace of the monitored portion of the execution of the first instructions. In embodiments, the trace may be stored in the one or more non-volatile memory modules. Other embodiments may be described and/or claimed.

25 Claims, 5 Drawing Sheets

(51) Int. Cl.
  *G06F 9/4401* (2018.01)
  *G06F 21/57* (2013.01)
(52) U.S. Cl.
  CPC ........ *G06F 21/575* (2013.01); *G06F 11/1417* (2013.01); *G06F 2201/84* (2013.01)

(56) References Cited

U.S. PATENT DOCUMENTS

| | | |
|---|---|---|
| 2003/0046610 A1 | 3/2003 | Yamamoto et al. |
| 2006/0031717 A1* | 2/2006 | Blanchard ........... G06F 11/3636 714/37 |
| 2006/0047942 A1* | 3/2006 | Rothman ................. G06F 8/61 713/2 |
| 2006/0242399 A1 | 10/2006 | Zimmer et al. |
| 2007/0214386 A1 | 9/2007 | Watanabe |
| 2009/0077365 A1 | 3/2009 | Masuyama et al. |
| 2012/0151201 A1* | 6/2012 | Clerc ...................... G06F 9/441 713/2 |
| 2013/0339718 A1 | 12/2013 | Kanaya et al. |

OTHER PUBLICATIONS

International Preliminary Report on Patentability dated Oct. 6, 2016 for International Application No. PCT/US2015/013317, 8 pages.
Extended European Search Report dated Dec. 21, 2017 for European Patent Application No. 15769354.0, 12 pages.
Kazuya Yamakita et al., "Phase-based Reboot: Reusing Operating System Execution Phases for Cheap Reboot-based Recovery", 2011, 12 pages.
Palsamy Sakthikumar et al., "White Paper a Tour beyond BIOS Implementing the ACPI Platform Error Interface with the Unified Extensible Firmware Interface", Jan. 31, 2013, 27 pages.
Office Action dated Oct. 3, 2017 for Japanese Patent Application No. JP2016-555320, 10 pages.
Office Action dated Jan. 31, 2018 for Korean Patent Application No. 10-2016-702274, 8 pages.

* cited by examiner

INITIALIZATION TRACE OF A COMPUTING DEVICE

TECHNICAL FIELD

Embodiments of the present disclosure are related to the field of initialization of a computing device, and in particular, to monitoring and tracing the initialization of a computing device.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

When a computing device is powered on an extensive initialization process may ensue before the computing device reaches an operable state. This initialization process may include initialization of hardware including memory, one or more processors, a number of specialized controllers, such as a memory controller, etc. Each of these pieces of hardware may be initialized through the execution of a sequence of instructions, such as firmware, stored on memory of the computing device, such as read only memory (ROM) or flash memory. This initialization process may include initializations performed in sequence, initializations performed in concert, or any combination thereof. For example, smaller computing devices, such as tablets and smart phones may perform boot tasks in concert to properly boot the platform. This sequence or concert of events, when properly executed, may cause the computing device to arrive at an operable state. If any aspect of this initialization process is carried out improperly, however, the computing device may fail to reach an operable state or may be compromised. If the improper initialization doesn't prevent the computing device from getting to an operational state, a user may have no way of knowing that the computing device initialized improperly. In addition, in the current state of the art, even if the user knows the initialization process is being carried out improperly it may be time consuming and difficult to track down exactly which part of the process is being executed improperly.

DETAILED DESCRIPTION OF ILLUSTRATIVE EMBODIMENTS

Figure 1:
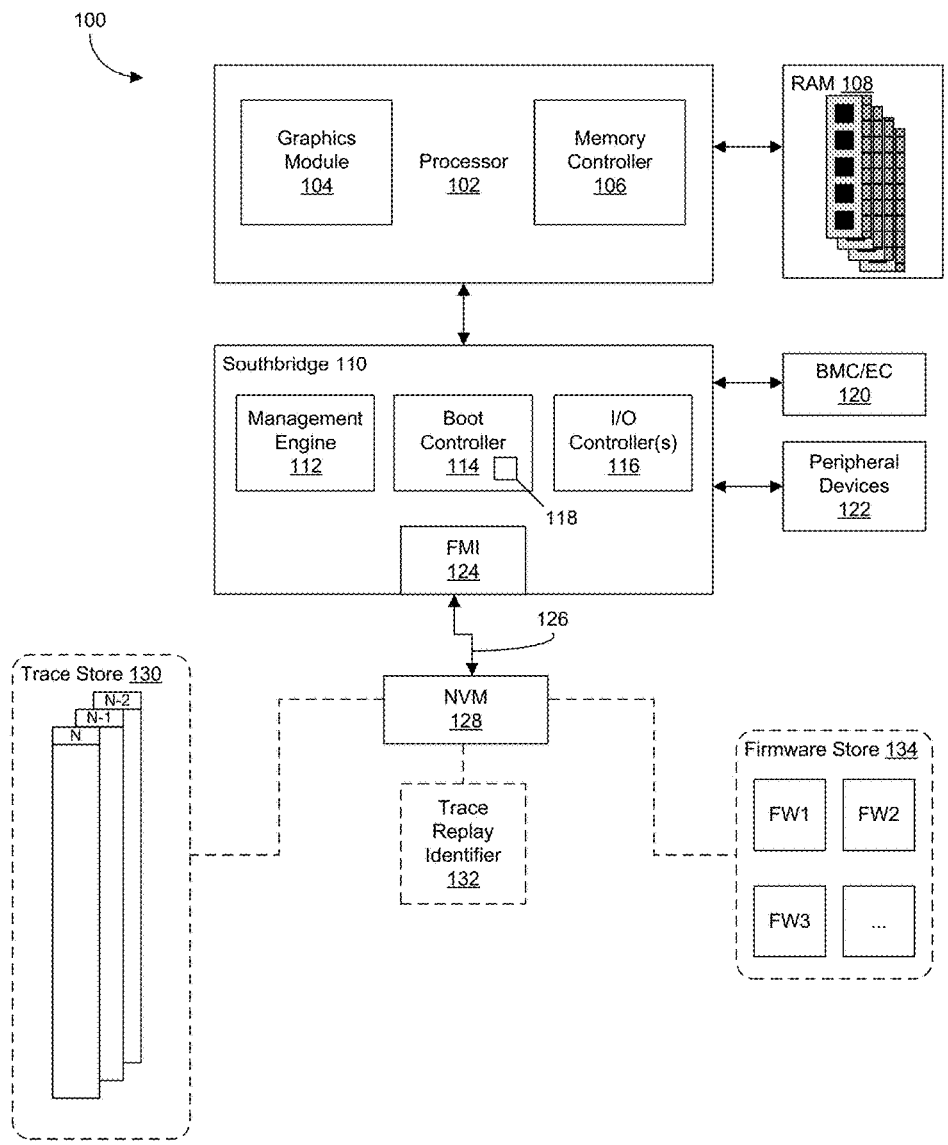
FIG. 1 depicts an illustrative configuration of a computing device having a boot controller, in accordance with various embodiments of the present disclosure.

Methods, storage media, and platform controller for tracing initialization of a computing device are described herein. In embodiments, a platform controller may include a boot controller. The boot controller may be coupled with a number of non-volatile memory modules that may have initialization instructions stored thereon for carrying out an initialization process on the computing device. A single initialization process may include initialization of a number of pieces of hardware, multiple microcontrollers, multiple software components, etc. to cause the computing device to arrive at an operable state. The number of non-volatile memory modules may also have instructions which, when executed by the boot controller, may cause the boot controller to monitor at least a portion of the execution of the initialization instructions, by the computing device, and may generate a trace of the monitored portion of the execution of the first instructions. In embodiments, the trace may be stored by the boot controller, in the number of non-volatile memory modules. For example, the initialization instructions may, in some embodiments, take the form of firmware utilized to initialize various controllers or engines of the computing device. The boot controller may monitor the execution of these firmwares and generate a trace from this monitoring. Namely, where M is the number of initializations captured by the boot controller by various microcontrollers (including the boot controller itself), the system boot is an aggregation of all M initializations. In addition to the monitored traces, there may be predefined traces, for example, without loss of generality, for booting the computing device into a manufacturing mode, recovery mode, performance mode, etc. In some embodiments, the boot controller may be configured to enable replaying of any trace accessible to the boot controller to initialize at least a portion of the computing device. In some embodiments a portion of a trace may be replayed. This may be beneficial, for example, to determine signatures associated with partial attacks. These signatures may then be utilized to secure the computing device against such attacks.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 depicts an illustrative configuration of a computing device 100 having a boot controller 114, in accordance with various embodiments of the present disclosure. Boot controller 114 may be configured to monitor an initialization process of computing device 100 and may generate a trace based upon the monitoring of the initialization process. An illustrative initialization process is discussed in greater detail in reference to FIG. 2, below. The trace may be utilized in any number of ways including, but not limited to, replay of all or a portion of the trace or utilization of the trace to validate the initialization process of computing device 100, both discussed in greater detail below.

In embodiments, computing device 100 may include one or more processors, such as processor 102, and one or more processing elements (e.g., Baseboard Management Controller (BMC), Innovation Engine (IE), not depicted in FIG. 1, Management Engine (ME), etc.) in a coherent domain. As used herein, coherent domain may refer to all controllers that may participate in a given boot sequence and may share memory and/or hardware resources. In some embodiments, processor 102 may include a graphics module 104 and a memory controller 106. Processor 102 may be comprised of a single processor core or multiple processor cores. In addition, in some embodiments, processor 102 may be one of a plurality of processors. In some embodiments, multiple non-coherent and/or coherent processors may work in concert to initialize a platform. In multiple processor embodiments, the multiple processors may be of the same type, i.e. homogeneous, or may be of differing types, i.e. heterogeneous and may include any type of single or multi-core processors. This disclosure is equally applicable regardless of type and/or number of processors.

Memory controller 106 may, in some embodiments, be integrated within the same package as processor 102, as depicted. In other embodiments, memory controller 106 may be a discrete chip or may be integrated within a different portion of computing device 100. Memory controller 106 may be configured to manage reading from and writing to one or more modules of random access memory (RAM) 108, as well as refreshing RAM 108.

In some embodiments, integrated graphics module 104 may be integrated within the same package as processor 102, as depicted. In other embodiments, integrated graphics module 104 may be a discrete chip, may be integrated with a different portion of computing device 100, may be implemented as a system on a chip (SoC), or may be implemented as a number of discrete components connected by a bus. Integrated graphics module 104 may include a processor configured to manipulate graphical data for output to a display of computing device 100. In some embodiments, integrated graphics module 104 may be supplanted by a dedicated graphics card.

Processor 102 may be coupled with southbridge 110. Southbridge 110 may take the form of a platform controller, or a portion thereof, such as, for example, a platform controller hub (PCH), firmware controller hub (FCH), input/output (I/O) controller hub, etc. As used herein a platform controller may include southbridge 110 as well as controllers and/or memory coupled with southbridge 100. Southbridge 110 may be configured to coordinate I/O functionality of computing device 100, such as, for example, via far memory interface (FMI) 124, one or more of peripheral component interconnects (PCIs), a universal serial bus (USB), a low pin count (LPC) bridge, a super peripheral interface (SPI) bus, a system management bus (SMB), etc. To accomplish this, southbridge 110 may include a number of controllers and/or engines, such as, for example, management engine (ME) 112 and one or more input/output (I/O) controllers 116. In some embodiments, a plurality of ME's may be integrated into computing device 100. For example, there may be a first ME for executing code, or firmware, provided by third party vendors of the components discussed above, while there may be an additional ME for executing the code, or firmware, of the platform. In some embodiments, southbridge 110 may also have a boot controller 114 integrated therewith. In other embodiments, boot controller 114 may be disposed on a discrete chip or integrated within another component of computing device 100. It will be appreciated that these engines and controllers are merely meant for illustration and are not meant to be limiting of this disclosure. Any number of controllers and/or engines may be included without departing from the scope of this disclosure. In addition, these controllers may take other forms or be disposed in different locations of computing device 100 without departing from the scope of this disclosure. In embodiments, southbridge 110 may be coupled with an out-of-band management controller, such as a BMC or other embedded controller (EC) 120, hereinafter BMC/EC 120 and one or more peripheral devices 122, such as, for example, a keyboard, mouse, camera, external hard drive, etc. In some embodiments, boot controller 114 may be integrated with the BMC/EC 120. Southbridge 110 may also include a far memory interface (FMI) 124, or other memory interface. FMI 124 may be coupled with non-volatile memory (NVM) 128 via data connection 126. In some embodiments, NVM 128 may be configured to operate in accordance with a double data rate (DDR) specification, such as, for example DDR4.

Each of the components described above, as well as any additional components of computing device 100, may require initialization before the component attains an operational state. Consequently, computing device 100 may undergo a complex initialization process, such as initialization process 200 of FIG. 2, before computing device 100 attains an operational state. In addition, many of these components may need access to specific firmware to accomplish the individual initializations. If a single component is not properly initialized it may prevent computing device 100 from attaining an operational state or may render computing device 100 vulnerable to viruses, malware, or a cyber-attack.

Figure 2:
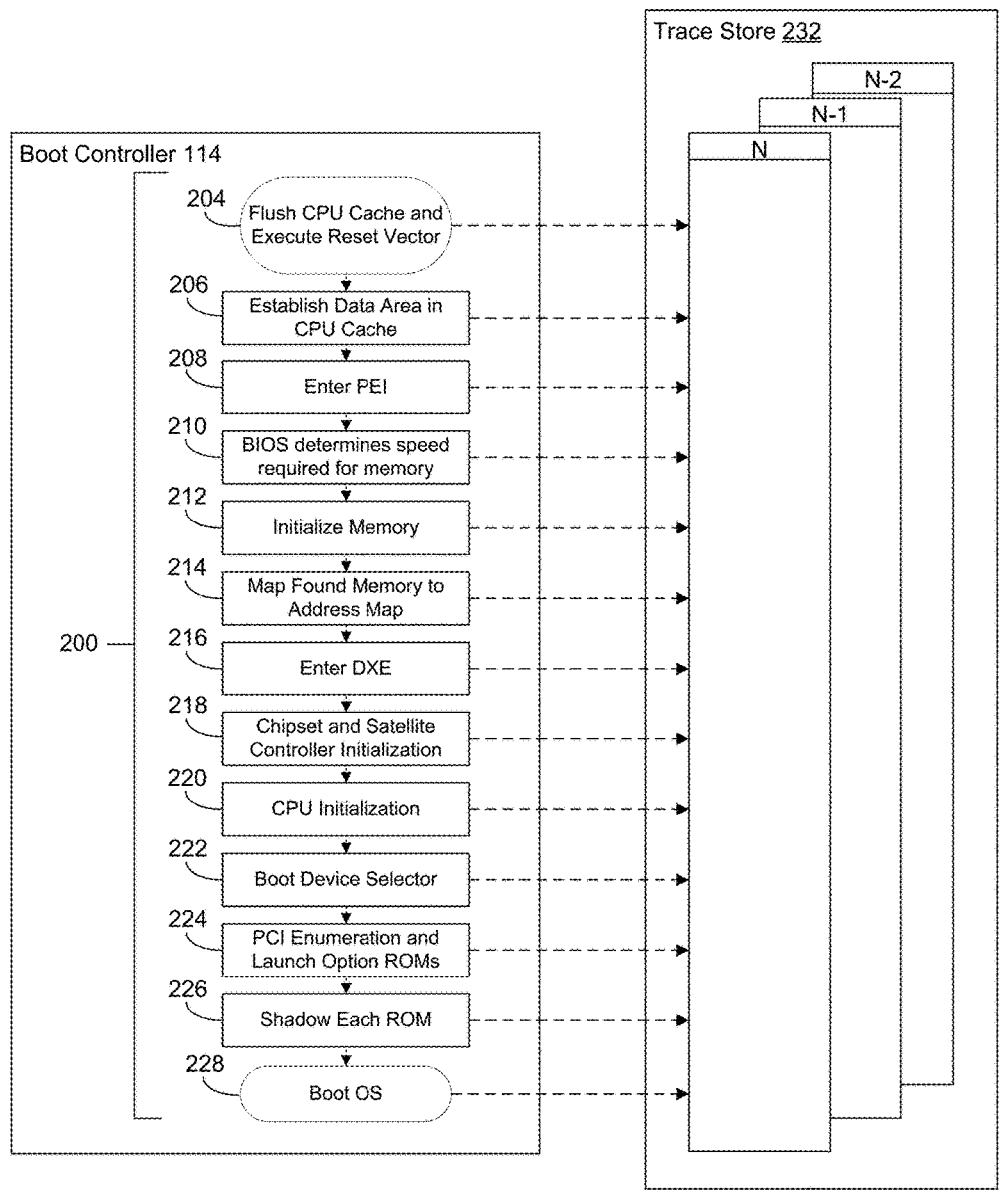
FIG. 2 depicts an illustrative boot process monitored by a boot controller, in accordance with various embodiments of the present disclosure.

In embodiments, boot controller 114 may be configured to monitor the initialization process, such as that depicted in FIG. 2, of computing device 100 and generate a trace of the monitored initialization process. Such a trace may include all of, or any portion of, the initialization procedures from a state prior to the execution of a reset vector to the instantiation of an operating system on computing device 100. In addition, in some embodiments, each initialization procedure, such as, the initialization of a BMC, IE, ME, Basic Input Output System (BIOS), memory controller, etc. may have trace segments associated with individual initializations of such components. In such embodiments, each of these trace segments may be generated through the monitoring performed by boot controller 114. In addition, each of these components may have predefined traces, for example a trace may be provided by a vendor of an individual component. This monitoring may be accomplished, in some embodiments, by provisioning boot controller 114, with a read only memory (ROM) 118 containing firmware to initialize boot controller 114 before the initialization process for computing device 100 begins. In some embodiments, all of the instructions necessary for carrying out the functionality, described herein, of boot controller 114 may be stored in ROM 118. In other embodiments, ROM 118 may merely contain initialization instructions for boot controller 114 to attain an operational state and boot controller 114 may retrieve executable instructions from another memory, such as NVM 128.

In embodiments, boot controller 114 may need access to memory, such as NVM 128, in order to carry out the monitoring of the initialization process and generation of an associated trace. For example, as discussed above, NVM 128 may contain executable instructions which may cause boot controller 114 to carry out at least a portion of the functionality described herein. In embodiments, boot controller 114 may be configured to access NVM 128 via FMI 124 and data connection 126 to enable boot controller 114 to carry out the monitoring process. As such, FMI 124 and data connection 126 may be initialized in a similar manner to that of boot controller 114 described above. In some embodiments, FMI 124 and data connection 126 may be initialized utilizing ROM 118, utilized to initialize boot controller 114. In other embodiments, FMI 124 and data connection 126 may be initialized utilizing a ROM separate from that of ROM 118. In some embodiments, boot controller 114, FMI 124, and data connection 126 may be initialized prior to a power-on self-test (POST) of computing device 100 to enable monitoring of computing device or any component thereof from a state prior to the POST of each individual component of computing device 100.

In embodiments, NVM 128 may be configured to include a trace store 130, a trace replay identifier 132, and/or a firmware store 134. Trace store 130 may be configured to store traces that were previously generated by boot controller 114 and/or a trace being currently generated by boot controller 114. In addition, in some embodiments, trace store 130 may be configured with predefined traces capable of initializing any single component or group of components of computing device 100, or the entirety thereof, to a special state. For example, there may be predefined traces that are optimized for system wide without loss of generality recovery, initialization to a performance mode, initialization to a power efficient mode, initialization to a malware protection mode, etc. Trace replay identifier 132, also referred to herein as boot controller mailbox, may be configured to store an identifier of a trace that a user of computing device 100 has selected to replay. In embodiments, boot controller 114 may be configured to check trace replay identifier 132 to determine if a trace has been selected for replay and, if so, may cause the identified trace to be replayed in place of the normal initialization process for computing device 100. This process is discussed in greater detail in reference to FIG. 6, below. Firmware store 134 may include all firmware necessary to initialize the individual components of computing device 100, or any portion thereof.

In some embodiments, individual components of computing device 100 may access firmware store 134 to retrieve the requisite firmware for initialization of the individual components. In such embodiments, boot controller 114 may be configured to monitor these accesses to aid in generating a trace to be stored in trace store 130. In other embodiments, boot controller 114 may be configured to act as a middleman or gatekeeper for NVM 128. In such embodiments, boot controller 114 may be configured to receive requests from the individual components for firmware contained within firmware store 134 and may service these requests by providing access to the requested firmware. In some embodiments, boot controller 114 may be configured to authenticate a requestor of firmware prior to providing access to the firmware to ensure the firmware is being provided to the proper component. In addition, in some embodiments, boot controller 114 may be configured to carry out updates to firmware stored within firmware store 134. In such embodiments, boot controller 114 may be configured to maintain previous versions of firmware that may be needed for replay of previously recorded traces stored in trace store 130. In some embodiments, boot controller 114 may be configured to generate a checksum from a generated trace to compare against a predefined validation code to validate the initialization process. In such embodiments, if the initialization process fails to be validated, boot controller may be configured to cause computing device to re-initialize utilizing a previously stored trace from trace store 130. This may be accomplished, for example, by boot controller 114 storing an identifier of a previously generated trace in trace replay identifier 132 and causing the computing device to reset. In addition, boot controller 114 may be configured to persist a generated trace in NVM 128 only upon successful validation of the traced initialization process. As discussed above, the trace may include initialization of any component or group of components of computing device 100, or the entirety thereof. As a result, the validation may be performed on a trace of any component or group of components of computing device 100, or the entirety thereof.

FIG. 2 depicts an illustrative initialization process 200, in accordance with various embodiments of the present disclosure. The initialization process may be monitored by boot controller 114 of FIG. 1 to generate a trace N in trace store 232, where N denotes a most recent trace of a number of traces. Initialization process 200 may begin in a security (SEC) phase at block 204 where the central processing unit (CPU) cache may be flushed and the basic input/output system (BIOS) reset vector may be executed. At block 206 a data area may be established in the CPU cache to enable a stack based programming language to be used prior to initialization of system memory.

At block 208 the SEC phase may hand off to a pre-extensible firmware interface (PEI) phase. In the PEI phase the BIOS may determine speed required for memory at block 210. After which, the memory may be initialized at block 212. At block 214 the initialization process may map the found memory to an address map defined for the memory. This memory map may associate memory addresses in the found memory with regions of memory covered by the memory map. For example, the memory map may designate a specific range of memory addresses as reserved memory addresses and the procedure at block 214 may designate these memory addresses as such.

At block 216 the PEI phase of the boot process may be completed and the driver execution environment DXE phase may begin. At block 218 the chipset and any satellite controllers may be initialized utilizing firmware respectively associated with these components. At block 220 the central processing unit (CPU) may be initialized. After the CPU has been initialized, a process to select the boot device from a prioritized list of potential bootable partitions may be executed at block 222. At block 224 the PCI enumeration process may be carried out to determine any devices connected to the PCI bus of the computing device and option ROMs may be launched to initialize these components. At block 226 a shadow, or copy, of each ROM may be stored in memory of the computing device. At block 228 an operating system (OS) for computing device may be booted.

This entire initialization process, or any portion thereof, may be monitored by boot controller 114 to generate a trace to be stored in trace store 232. The above described initialization process is meant to merely illustrate an example initialization process. As such, the initialization process depicted may only represent a subset of the actual processes carried out initializing the computing device. It will be appreciated that the initialization process may include additional process or vary depending upon the computing device and the components contained therein. This disclosure is equally applicable regardless of the initialization process that may be carried out by the computing device.

Figure 3:
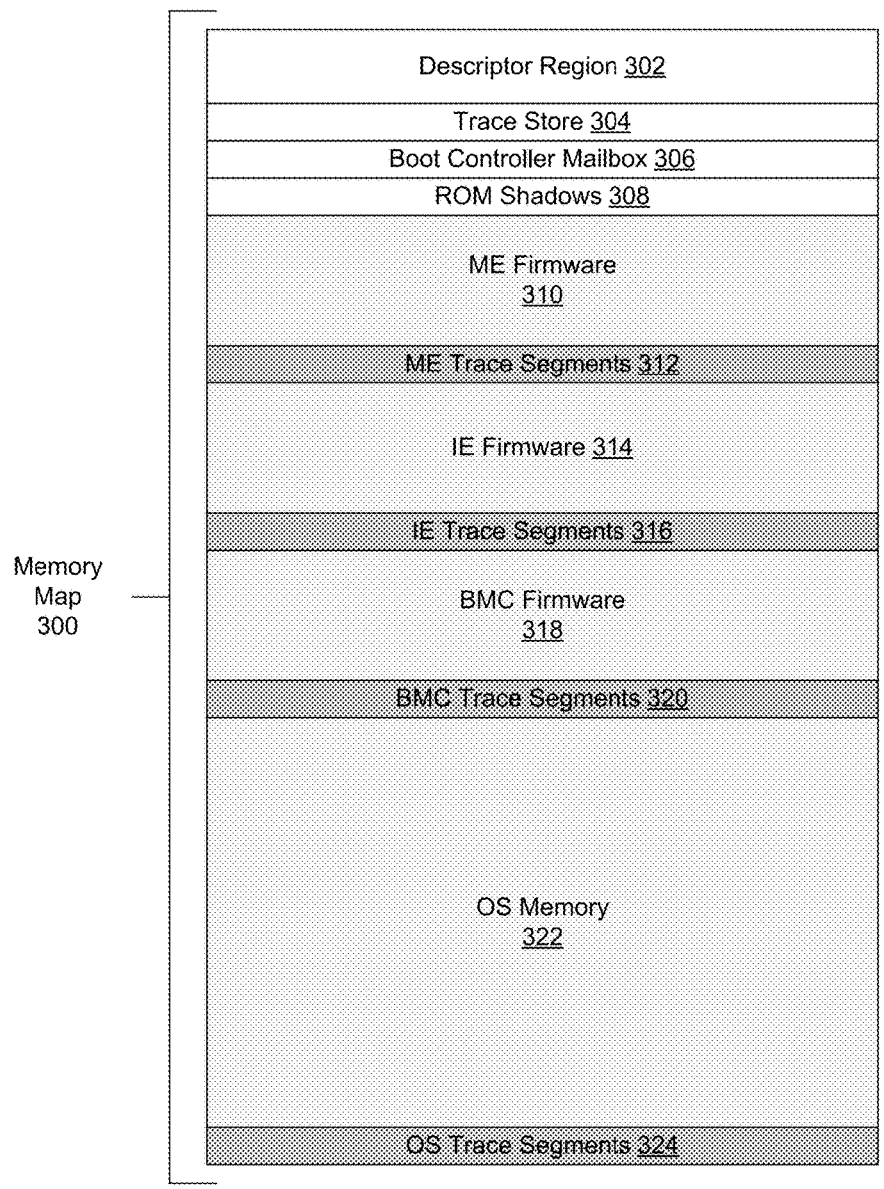
FIG. 3 depicts illustrative memory map of non-volatile memory, in accordance with various embodiments of the present disclosure.

FIG. 3 depicts an illustrative memory map 300 of non-volatile memory, such as NVM 128 of FIG. 1, in accordance with various embodiments of the present disclosure. Memory map 300 may define a layout for NVM and may designate ranges, or regions, of memory addresses in the NVM to reserve for certain aspects of the present disclosure. In embodiments, memory map 300 may include a descriptor region 302. Descriptor region 302 may contain access permissions for the different regions defined by memory map 300 that a component, such as a boot controller, may utilize to restrict access to the various regions. Trace store 304 may be configured to store traces generated by a boot controller of an initialization process of a computing device. Memory map 300 may also include a boot controller mailbox 306 which may be utilized to store an identifier of a trace to be replayed, such as trace replay identifier 132 of FIG. 1. In embodiments, memory map 300 may include ROM shadows 308 which may contain copies of ROM that may have been utilized in initializing the computing device to enable the replay of a ROM identified in a previously generated trace.

In some embodiments, trace store 304 may include traces containing all of the processes necessary to initialize the computing device. In some embodiments, individual components of the computing device may have respective firmware stores, rather than having a single firmware store containing firmware for all of the individual components, as depicted in FIG. 1. In such embodiments, the firmware for each component may be stored in individual stores such as management engine (ME) firmware 310, innovation engine (IE) firmware 314, and baseboard management controller (BMC) firmware 318. Each of these firmware stores, 310, 314, and 318, may contain not only the latest firmware for the individual components, but may also contain previous versions of firmware that may be necessary to replay a previously generated trace. Analogous to the firmware utilized for initializing individual components of the computing device, the memory map may also include an operating system (OS) memory 322 region. This region may contain memory entries necessary to instantiate an operating system on the computing device. In embodiments, OS memory 322 may also contain OS state information for a user driven checkpoint, such as that discussed in reference to FIG. 5, below.

In some embodiments, trace store 304 may contain all of the processes necessary to initialize the individual components of the computing device. In other embodiments, the traces stored in trace store 304 may contain an abridged version of the initialization process with links to trace segments generated through the initialization of individual components. For example, trace store may contain traces with links to trace contained in ME trace segments 312, IE trace segments 316, BMC trace segments 320, and OS trace segments 324. The combination of the trace segments with the trace in trace store 304 may encompass an entire initialization process for the computing device.

Figure 4:
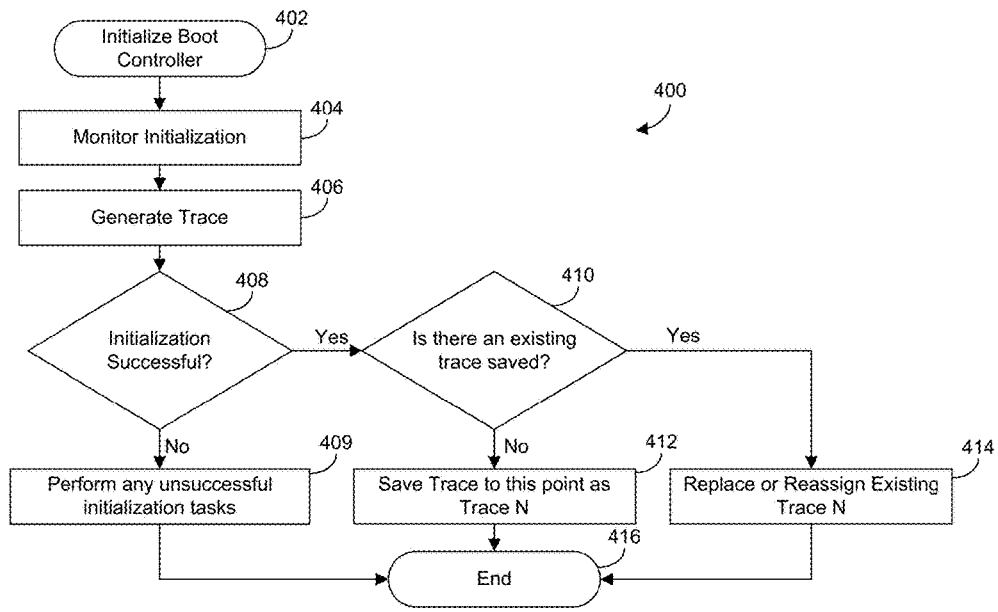
FIG. 4 depicts an illustrative process flow for generating an initialization trace, in accordance with various embodiments of the present disclosure.

FIG. 4 depicts an illustrative process flow 400 for generating an initialization trace of a computing device by a boot controller, in accordance with various embodiments of the present disclosure. At block 402 the process may begin with the initialization of a boot controller, such as that discussed elsewhere herein. At block 404 boot controller may monitor an initialization process of the computing device, such as, for example, initialization process 200 of FIG. 2. At block 406 boot controller may generate a trace, such as those discussed above, from the monitored initialization.

At block 408 a determination may be made as to whether the initialization was successful. In some embodiments, a determination of whether the initialization was successful may be made based upon verification of a checksum generated by the boot controller from the trace of the initialization. This determination/verification process may be carried out by the boot controller, another component of computing device, a remote computing device that may be coupled with the computing device by way of a network, or a user or administrator of computing device. This checksum may be beneficial, for example, when utilized in a server farm or data warehouse where each computing device may have different components, but an administrator may want to ensure expected initialization processes of the individual computing devices. In such an environment, the individual computing devices may transmit the checksum to a central repository for comparison with an expected value for the individual computing devices. In other embodiments, success of the initialization may be determined based upon results of a system test performed by the computing device. In still other embodiments, a user or administrator may verify the initialization based upon the operability of the computing device.

If the initialization is not successful, the process may proceed to block 409 where any unsuccessful initialization tasks may be performed after which the process may proceed to block 416 where the process may end. In some embodiments, unsuccessful initialization tasks may include the boot controller resetting the computing system and replaying a trace, that was previously generated, to properly initialize the computing device. In other embodiments, unsuccessful initialization tasks may include a user or administrator enacted policy. For example, an administrator may desire a predefined trace, such as one of the predefined traces discussed above, that the administrator would like to utilize to initialize the computing device, or a portion thereof, in the event of an unsuccessful initialization. In still other embodiments, unsuccessful initialization tasks may include generation of a prompt or log by the boot controller to inform a user or administrator of the computing device of the unsuccessful initialization.

If the initialization is successful, the process may proceed to block 410. At block 410 boot controller may determine whether or not there is an existing trace that was previously saved. If there is not an existing trace then the process may proceed to block 412 where the boot controller may save the trace as trace N, where N indicates a most recent trace and the process may end at block 416. If there is an existing trace then, in some embodiments, the process may proceed to block 414 where the boot controller may relegate previous trace N to trace N−1, and so on for other previously stored traces. In other embodiments boot controller may merely replace previous trace N with the current trace. After the previous trace is relegated or replaced, the process may proceed to block 416 where the process may end. As discussed above, in some embodiments, there may be trace segments associated with each of the components of the computing device. In such embodiments, there may be a trace segment N for each component. Each of these trace segments may be analyzed to determine successfulness of initialization and may be appended to trace N upon successful initialization of the respective component.

Figure 5:
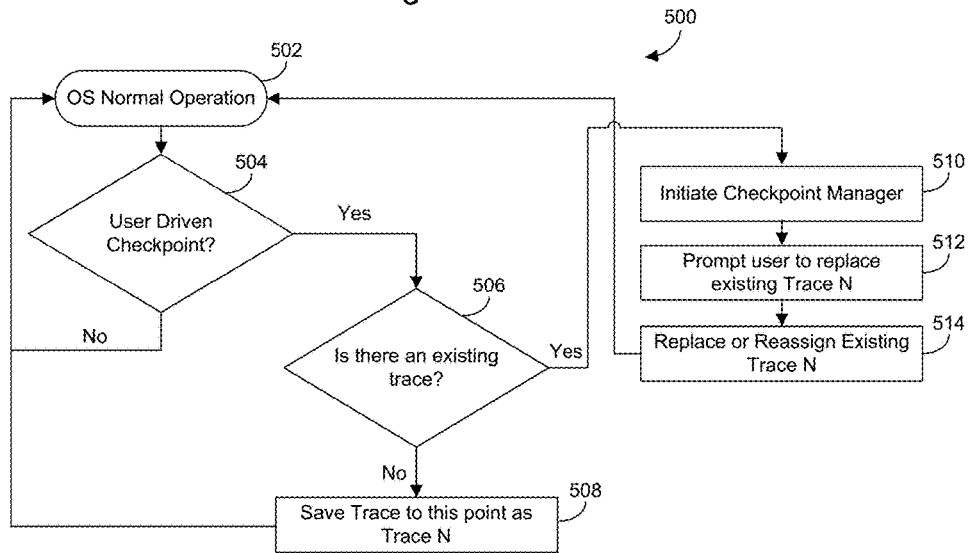
FIG. 5 depicts an illustrative process flow for establishing user driven checkpoints, in accordance with various embodiments of the present disclosure.

FIG. 5 depicts an illustrative process flow 500 for establishing user driven checkpoints on a computing device, in accordance with various embodiments of the present disclosure. The process may begin at block 502 where an operating system (OS) may reach a state of normal operation. At block 504 a determination may be made as to whether a user driven checkpoint has been reached. This determination may be made by the boot controller, a component of the OS, or another suitable component. If a component other than the boot controller makes this determination, then, in some embodiments, a positive result of the determination may be communicated to the boot controller. Such a determination may be based upon specific applications or events on the computing system that the user may have defined as a checkpoint denoting proper operation of the computing device. For example, the checkpoint may be defined by the initialization of a predefined application that the user regularly utilizes, such as an electronic mail (email) client or other similar event. If it is determined that a user driven checkpoint has not occurred then the process may return to block 502 and the OS may continue operating normally.

If it is determined that the event is a user driven checkpoint, the process may proceed to block 506. At block 506 boot controller may determine whether there is an existing trace for this checkpoint that was previously saved. If there is not an existing trace then the process may proceed to block 508 where boot controller may save this checkpoint as trace N, where N indicates a most recent trace and the process may proceed back to normal OS operation at block 502. If there is an existing trace then the process may proceed to block 510 where boot controller, a component of the OS, or another suitable component, may initiate a checkpoint manager. Once the checkpoint manager is initiated, the user of the computing device may be prompted by the checkpoint manager to determine if the trace to this checkpoint is to replace or relegate previously generated trace N. In some embodiments, the checkpoint manager may be part of the boot controller. In other embodiments, the checkpoint manager may be implemented as part of the OS and may be configured to communicate with the boot controller. At block 514 the previous trace N may be relegated, by the boot controller, to trace N−1, if the user so selects, or the boot controller may merely replace trace N with the current trace. After the previous trace N is relegated or replaced the process may proceed to block 502 where the OS may continue normal operation. It will be appreciated that the number of traces capable of being stored may only be limited by the storage capacity of the memory holding the traces.

In some embodiments, the traces may have a designation of which user driven checkpoint caused the respective traces to be saved. In such embodiments, the traces may be organized based upon the user driven checkpoint and if the user would like to replay one of these traces, they may be able to select a user driven checkpoint to identify which trace the user would like to replay through a process such as that depicted in FIG. 6.

Figure 6:
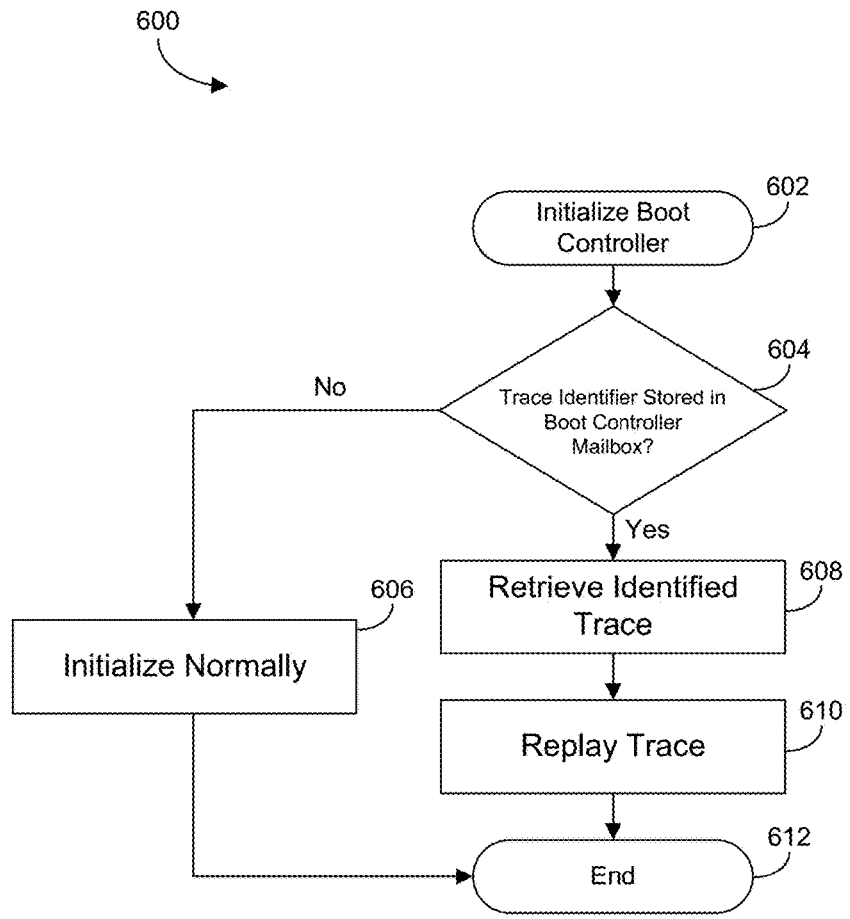
FIG. 6 depicts an illustrative process flow for replaying a trace to initialize a computing device, in accordance with various embodiments of the present disclosure.

FIG. 6 depicts an illustrative process flow 600 for replaying a trace to initialize a computing device, in accordance with various embodiments of the present disclosure. The process may begin at block 602 where the boot controller may be initialized. At block 604 the boot controller may determine whether a trace identifier has been stored in a boot controller mailbox, such as that discussed above. If there is no trace identifier stored in the boot controller mailbox the process may proceed to block 606 where the computing device may initialize normally. After which, the process may end at block 612. If there is a trace identifier stored in the boot controller mailbox, the process may proceed to block 608 where the identified trace may be retrieved by the boot controller. At block 610, the boot controller may replay the trace to initialize the computing device in place of the normal initialization process. After which, the process may end at block 612. In some embodiments, each component of the computing device may be associated with a trace segment, such as that described above. In such embodiments, replay of the trace may include replay of these trace segments in concert to fulfill replaying the selected trace. In some embodiments, the trace may be stored on a remote server, cloud, network attached storage (NAS), or the like. In such embodiments, the trace identifier may also include an address at which to retrieve the trace.

In some embodiments, the boot controller mailbox may be flushed after retrieving the trace. In other embodiments, the boot controller mailbox may be persisted to ensure the same trace is utilized for each initialization of the computing device, until a user decides to generate a new trace. This may occur, for example, where the user wants to ensure consistent initialization of the computing device. In such a scenario, the user may choose to only generate a new trace when a change occurs to the computing device, such as a firmware update for a component of the computing device or addition of new hardware or software to the computing device.

For the purposes of this description, a computer-usable or computer-readable medium can be any medium that can contain, store, communicate, propagate, or transport the program for use by or in connection with the instruction execution system, apparatus, or device. The medium can be volatile or non-volatile memory. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

EXAMPLES

According to various embodiments, the present disclosure describes a number of examples. Example 1 is a platform controller comprising: a boot controller; and one or more non-volatile memory modules, coupled with the boot controller, having stored thereon: first instructions which, when executed by a processor of a computing device hosting the platform controller, cause initialization of the computing device; and second instructions which, when executed by the boot controller, cause the boot controller to monitor at least a portion of the execution of the first instructions by the computing device, and to generate a trace of the monitored portion of the execution of the first instructions to be stored in the one or more non-volatile memory modules.

Example 2 may include the subject matter of Example 1, wherein the second instructions, when executed by the boot controller, are to monitor execution of the first instructions by the computing device from an initial state prior to execution of a power on self-test (POST) to a subsequent state where an operating system (OS) is instantiated on the computing device.

Example 3 may include the subject matter of Example 2, wherein the second instructions, when executed by the boot controller, persist the trace in the one or more non-volatile memory modules upon successful completion of the first instructions.

Example 4 may include the subject matter of any one of Examples 1-3, wherein the one or more non-volatile memory modules are to store a plurality of traces of a plurality of previously monitored executions of the first instructions, generated by the boot controller.

Example 5 may include the subject matter of any one of Examples 1-3, wherein the second instructions, when executed by the boot controller, further cause the boot controller to: present, in response to a request, a plurality of previously generated and stored traces to a user of the computing device for selection; and replay a selected one of the previously generated and stored traces, upon selection, to initialize the computing device.

Example 6 may include the subject matter of Example 5, wherein to replay the selected trace further comprises storage of an identifier associated with the selected trace in the one or more non-volatile memory modules to provide the boot controller with access to the identifier upon a next initialization of the boot controller.

Example 7 may include the subject matter of Example 6, wherein to replay the selected trace further comprises: retrieval, upon the next initialization of the boot controller, of the identifier from the one or more non-volatile memory modules; identification of the selected trace via the identifier; and utilization of the selected trace to initialize the computing device.

Example 8 may include the subject matter of any one of Examples 1-3, wherein the second instructions, when executed by the boot controller, further cause the boot controller to generate a checksum, based on the trace, upon successful completion of the monitored execution of the first instructions.

Example 9 may include the subject matter of Example 8, wherein the second instructions, when executed by the boot controller, further cause the boot controller to compare the checksum with an expected checksum to verify initialization of the computing device.

Example 10 may include the subject matter of any one of Examples 1-3, wherein the first instructions comprise a plurality of firmware to initialize a plurality of hardware components residing on the computing device.

Example 11 may include the subject matter of Example 10, wherein the second instructions, when executed by the boot controller, further cause the boot controller to: generate the trace through generation of a trace segment corresponding with each hardware component of the plurality of hardware components; and make available each trace segment to the corresponding hardware component to access and replay the trace segment.

Example 12 is one or more computer-readable media comprising instructions which, when executed by a boot controller of a computing device, cause the boot controller to: monitor an initialization of the computing device by a basic input/output system (BIOS) of the computing device, wherein the boot controller and BIOS are independent of each other; generate a trace of the monitored initialization of the computing device; and store the generated trace of the monitored initialization in a memory of the computing device.

Example 13 may include the subject matter of Example 12, wherein to monitor an initialization is to monitor the computing device from an initial state prior to execution of a power on self-test (POST) to a subsequent state where an operating system (OS) is instantiated on the computing device.

Example 14 may include the subject matter of Example 12, wherein to store the generated trace is to persist the trace in the one or more non-volatile memory modules upon successful completion of the initialization.

Example 15 may include the subject matter of Example 14, wherein to persist the trace is to persist the trace in a repository of a plurality of other traces, wherein the other traces were generated from previously monitored initializations of the computing device.

Example 16. The computer-readable media of any one of claims 12-15, wherein the instructions, when executed by the boot controller, further cause the boot controller to: present, in response to a request, a plurality of previously generated and stored traces to a user of the computing device for selection; and replay a selected one of the previously generated and stored traces, upon selection, to initialize the computing device.

Example 17 may include the subject matter of Example 16, wherein to replay the selected trace further comprises storage of an identifier associated with the selected trace in a location accessible by the boot controller during an initialization of the boot controller to provide the boot controller with access to the identifier upon a next initialization of the boot controller.

Example 18 may include the subject matter of Example 17, wherein to replay the selected trace further comprises: retrieval, upon the next initialization of the boot controller, of the identifier from the one or more non-volatile memory modules; acquisition of the selected trace based on the identifier; and utilization of the acquired trace to initialize the computing device.

Example 19 may include the subject matter of any one of Examples 12-15, wherein the instructions, when executed by the boot controller, further cause the boot controller to generate, upon successful completion of the initialization of the computing device, a checksum, based on the trace.

Example 20 may include the subject matter of Example 19, wherein the instructions, when executed by the boot controller, further cause the boot controller to compare the checksum with an expected checksum to verify initialization of the computing device.

Example 21 may include the subject matter of any one of Examples 12-15, wherein the initialization of the computing device comprises execution of a plurality of firmware to initialize a plurality of hardware components of the computing device.

Example 22 may include the subject matter of Example 21, wherein the instructions, when executed by the boot controller, further cause the boot controller to: generate the trace through generation of a trace segment corresponding with each hardware component of the plurality of hardware components; and provide access of the trace segment to the corresponding hardware component to enable replay of the trace segment by the corresponding hardware component.

Example 23 is a computer implemented method comprising: monitoring, by a boot controller of a computing device, an initialization of the computing device by a basic input/output system (BIOS) of the computing device, the boot controller and BIOS being independent of each other; generating, by the boot controller, a trace of the monitored initialization of the computing device; and storing, by the boot controller, the generated trace of the initialization in a memory of the computing device.

Example 24 may include the subject matter of Example 23, wherein monitoring the initialization of the computing device further comprises: monitoring the initialization of the computing device from an initial state prior to execution of a power on self-test (POST) to a subsequent state where an operating system (OS) is instantiated on the computing device.

Example 25 may include the subject matter of Example 24, further comprising persisting, by the boot controller, the trace in non-volatile memory of the computing device upon successful completion of the initialization.

Example 26 may include the subject matter of Example 25, wherein persisting the trace further comprises persisting the trace in a repository of a plurality of other traces, wherein the other traces were generated from previously monitored initializations of the computing device.

Example 27 may include the subject matter of any one of Examples 23-26, further comprising: presenting, by the boot controller, in response to a request, a plurality of previously generated and stored traces to a user of the computing device for selection; receiving a selection of one of the plurality of previously generated and stored traces; and replaying the selected one of the plurality of previously generated and stored traces to initialize the computing device.

Example 28 may include the subject matter of Example 27, wherein replaying the selected trace further comprises: storing of an identifier associated with the selected trace in non-volatile memory of the computing device.

Example 29 may include the subject matter of Example 28, wherein replaying the selected trace further comprises: retrieving, upon the next initialization of the boot controller, the identifier from the non-volatile memory; acquiring, by the boot controller, the selected trace based upon the identifier; and initializing the computing device utilizing the acquired trace.

Example 30 may include the subject matter of any one of Examples 23-26, further comprising: generating, by the boot controller, a checksum, based on the trace, upon successful completion of the monitored execution of the first instructions.

Example 31 may include the subject matter of Example 30, further comprising: validating, by the boot controller, the generated checksum against an expected checksum; and notifying, by the boot controller, a user of the computing device when the validation of the generated checksum fails.

Example 32 may include the subject matter of any one of Examples 23-26, wherein initialization of the computing device comprises executing a plurality of firmware to initialize a plurality of hardware components of the computing device.

Example 33 may include the subject matter of Example 32, wherein generating the trace further comprises: generating a trace segment corresponding with each hardware component of the plurality of hardware components, wherein the trace comprises a combination of trace segments; and providing access of the trace segment to the corresponding hardware component to enable replay of the trace segment by the corresponding hardware component.

Example 34 is a computing device comprising: means for monitoring an initialization of the computing device by a basic input/output system (BIOS) of the computing device, the means for monitoring and the BIOS being independent of each other; means for generating a trace of the monitored initialization of the computing device; and means for storing the generated trace of the initialization in a memory of the computing device.

Example 35 may include the subject matter of 34, wherein the means for monitoring the initialization of the computing device further comprise: means for monitoring the initialization of the computing device from an initial state prior to execution of a power on self-test (POST) to a subsequent state where an operating system (OS) is instantiated on the computing device.

Example 36 may include the subject matter of Example 35, further comprising means for persisting the trace in non-volatile memory of the computing device upon successful completion of the initialization.

Example 37 may include the subject matter of Example 36, wherein means for persisting the trace further comprises means for persisting the trace in a repository of a plurality of other traces, wherein the other traces were generated from previously monitored initializations of the computing device.

Example 38 may include the subject matter of any one of Examples 34-37, further comprising: means for presenting in response to a request, a plurality of previously generated and stored traces to a user of the computing device for selection; means for receiving a selection of one of the plurality of previously generated and stored traces; and means for replaying the selected one of the plurality of previously generated and stored traces to initialize the computing device.

Example 39 may include the subject matter of Example 38, wherein the means for replaying the selected trace further comprise: means for storing of an identifier associated with the selected trace in non-volatile memory of the computing device.

Example 40 may include the subject matter of Example 39, wherein means for replaying the selected trace further comprises: means for retrieving the identifier from the non-volatile memory; means for acquiring the selected trace based upon the identifier; and means for initializing the computing device utilizing the acquired trace.

Example 41 may include the subject matter of any one of Examples 34-37, further comprising: means for generating a checksum, based on the trace, upon successful completion of the monitored execution of the first instructions.

Example 42 may include the subject matter of Example 41, further comprising: means for validating the generated checksum against an expected checksum; and means for notifying a user of the computing device when the validation of the generated checksum fails.

Example 43 may include the subject matter of any one of Examples 34-37, wherein initialization of the computing device comprises executing a plurality of firmware to initialize a plurality of hardware components of the computing device.

Example 44 may include the subject matter of Example 43, wherein the means for generating the trace further comprises: means for generating a trace segment corresponding with each hardware component of the plurality of hardware components, wherein the trace comprises a combination of trace segments; and means for providing access of the trace segment to the corresponding hardware component to enable replay of the trace segment by the corresponding hardware component.

What is claimed is:

1. A platform controller comprising:
   a boot controller with a provision of a read only memory (ROM); and
   one or more non-volatile memory modules, coupled with the boot controller, having stored thereon:
     first instructions which, when executed by a processor of a computing device hosting the platform controller after the boot controller is initialized using the ROM, cause initialization of the computing device, wherein the ROM contains initialization instructions for the boot controller to attain an operational state; and
     second instructions which, when executed by the boot controller at least in part while the first instructions are executed by the processor, cause the boot controller to monitor at least a portion of the execution of the first instructions by the processor, and to generate a trace of the monitored portion of the execution of the first instructions to be stored in the one or more non-volatile memory modules, wherein to monitor at least the portion of the execution of the first instructions, the boot controller, after its initialization, but before the initialization of the computing device, further establishes a connection with the one or more non-volatile memory modules by initializing a memory interface with the one or more non-volatile memory modules using instructions of the ROM.

2. The platform controller of claim 1, wherein the second instructions, when executed by the boot controller, are to monitor execution of the first instructions by the computing device from an initial state prior to execution of a power on self-test (POST) to a subsequent state where an operating system (OS) is instantiated on the computing device, and the boot controller contained within the platform controller included in the computing device is initialized prior to the POST of the computing device.

3. The platform controller of claim 2, wherein the second instructions, when executed by the boot controller, persist the trace in the one or more non-volatile memory modules upon successful completion of the first instructions.

4. The platform controller of claim 1, wherein the one or more non-volatile memory modules are to store a plurality of traces of a plurality of previously monitored executions of the first instructions, generated by the boot controller.

5. The platform controller of claim 1, wherein the second instructions, when executed by the boot controller, further cause the boot controller to:
   present, in response to a request, a plurality of previously generated and stored traces to a user of the computing device for selection; and
   replay a selected one of the previously generated and stored traces, upon selection, to initialize the computing device.

6. The platform controller of claim 5, wherein to replay the selected trace further comprises storage of an identifier associated with the selected trace in the one or more non-volatile memory modules to provide the boot controller with access to the identifier upon a next initialization of the boot controller.

7. The platform controller of claim 6, wherein to replay the selected trace further comprises:
   retrieval, upon the next initialization of the boot controller, of the identifier from the one or more non-volatile memory modules;
   identification of the selected trace via the identifier; and
   utilization of the selected trace to initialize the computing device.

8. The platform controller of claim 1, wherein the second instructions, when executed by the boot controller, further cause the boot controller to generate a checksum, based on the trace, upon successful completion of the monitored execution of the first instructions.

9. The platform controller of claim 8, wherein the second instructions, when executed by the boot controller, further cause the boot controller to compare the checksum with an expected checksum to verify initialization of the computing device.

10. The platform controller of claim 1, wherein the first instructions comprise a plurality of firmware to initialize a plurality of hardware components residing on the computing device.

11. The platform controller of claim 10, wherein the second instructions, when executed by the boot controller, further cause the boot controller to:
    generate the trace through generation of a trace segment corresponding with each hardware component of the plurality of hardware components; and
    make available each trace segment to the corresponding hardware component to access and replay the trace segment.

12. One or more non-transitory computer-readable media embodied thereon instructions which, when executed by a boot controller of a computing device, cause the boot controller to:
    monitor an initialization of the computing device by a basic input/output system (BIOS) of the computing device, wherein the boot controller and BIOS are independent of each other, the initialization of the computing device is performed by a processor of the computing device, where the processor of the computing device is different from the boot controller, and the boot controller of the computing device is initialized using a read only memory (ROM) before the initialization of the computing device, and the ROM contains initialization instructions for the boot controller to attain an operational state;
    generate a trace of the monitored initialization of the computing device; and
    store the generated trace of the monitored initialization in one or more non-volatile memory modules, wherein the boot controller, after its initialization, but before the initialization of the computing device, further establishes a connection with the one or more non-volatile memory modules by initializing a memory interface with the one or more non-volatile memory modules using instructions of the ROM.

13. The non-transitory computer-readable media of claim 12, wherein to monitor an initialization is to monitor the computing device from an initial state prior to execution of a power on self-test (POST) to a subsequent state where an operating system (OS) is instantiated on the computing device, and the boot controller of the computing device is initialized prior to the POST of the computing device.

14. The non-transitory computer-readable media of claim 12, wherein the instructions, when executed by the boot controller, further cause the boot controller to:
present, in response to a request, a plurality of previously generated and stored traces to a user of the computing device for selection; and
replay a selected one of the previously generated and stored traces, upon selection, to initialize the computing device.

15. The non-transitory computer-readable media of claim 14, wherein to replay the selected trace further comprises storage of an identifier associated with the selected trace in a location accessible by the boot controller during an initialization of the boot controller to provide the boot controller with access to the identifier upon a next initialization of the boot controller.

16. The non-transitory computer-readable media of claim 15,
wherein to replay the selected trace further comprises:
retrieval, upon the next initialization of the boot controller, of the identifier from the one or more non-volatile memory modules;
acquisition of the selected trace based on the identifier; and
utilization of the acquired trace to initialize the computing device.

17. The non-transitory computer-readable media of claim 12, wherein the instructions, when executed by the boot controller, further cause the boot controller to generate, upon successful completion of the initialization of the computing device, a checksum, based on the trace.

18. The non-transitory computer-readable media of claim 17, wherein the instructions, when executed by the boot controller, further cause the boot controller to compare the checksum with an expected checksum to verify initialization of the computing device.

19. The non-transitory computer-readable media of claim 12, wherein the initialization of the computing device comprises execution of a plurality of firmware to initialize a plurality of hardware components of the computing device, and wherein the instructions, when executed by the boot controller, further cause the boot controller to:
generate the trace through generation of a trace segment corresponding with each hardware component of the plurality of hardware components; and
provide access of the trace segment to the corresponding hardware component to enable replay of the trace segment by the corresponding hardware component.

20. A computer implemented method comprising:
monitoring, by a boot controller of a computing device, an initialization of the computing device by a basic input/output system (BIOS) of the computing device, the boot controller and BIOS being independent of each other, wherein the initialization of the computing device is being performed by a processor of the computing device, and the processor of the computing device is different from the boot controller, and the boot controller of the computing device is initialized using a ROM before the initialization of the computing device, and the ROM contains initialization instructions for the boot controller to attain an operational state;
generating, by the boot controller, a trace of the monitored initialization of the computing device; and
storing, by the boot controller, the generated trace of the initialization in one or more non-volatile memory modules, wherein the boot controller, after its initialization, but before the initialization of the computing device, further establishes a connection with the one or more non-volatile memory modules by initializing a memory interface with the one or more non-volatile memory modules using instructions of the ROM.

21. The method of claim 20, wherein monitoring the initialization of the computing device further comprises: monitoring the initialization of the computing device from an initial state prior to execution of a power on self-test (POST) to a subsequent state where an operating system (OS) is instantiated on the computing device, and the boot controller of the computing device is initialized prior to the POST of the computing device.

22. The method of claim 20, further comprising:
presenting, by the boot controller, in response to a request, a plurality of previously generated and stored traces to a user of the computing device for selection;
receiving a selection of one of the plurality of previously generated and stored traces; and
replaying the selected one of the plurality of previously generated and stored traces to initialize the computing device.

23. The method of claim 22, wherein replaying the selected trace further comprises:
storing of an identifier associated with the selected trace in non-volatile memory of the computing device
retrieving, upon the next initialization of the boot controller, the identifier from the non-volatile memory;
acquiring, by the boot controller, the selected trace based upon the identifier; and
initializing the computing device utilizing the acquired trace.

24. The method of claim 20, further comprising:
generating, by the boot controller, a checksum, based on the trace, upon successful completion of the monitored execution of the first instructions;
validating, by the boot controller, the generated checksum against an expected checksum; and
notifying, by the boot controller, a user of the computing device when the validation of the generated checksum fails.

25. The method of claim 20, wherein initialization of the computing device comprises executing a plurality of firmware to initialize a plurality of hardware components of the computing device, and wherein generating the trace further comprises:
generating a trace segment corresponding with each hardware component of the plurality of hardware components, wherein the trace comprises a combination of trace segments; and
providing access of the trace segment to the corresponding hardware component to enable replay of the trace segment by the corresponding hardware component.

* * * * *